(12) United States Patent
Chan et al.

(10) Patent No.: US 8,738,514 B2
(45) Date of Patent: May 27, 2014

(54) SYSTEM AND METHOD FOR PROVIDING BORROW COVERAGE SERVICES TO SHORT SELL SECURITIES

(75) Inventors: Tommy Chan, Forest Hills, NY (US); Jennifer Sclafani, New York, NY (US); Jeremy M. Dobrick, New York, NY (US); Rajiv T. Yadlapalli, New York, NY (US); Matthew Bax, London (GB); Dean X. Fezza, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 13/030,914

(22) Filed: Feb. 18, 2011

(65) Prior Publication Data

US 2011/0202452 A1 Aug. 18, 2011

Related U.S. Application Data

(60) Provisional application No. 61/305,896, filed on Feb. 18, 2010.

(51) Int. Cl.
*G06Q 40/00* (2012.01)
(52) U.S. Cl.
USPC .................................. 705/38; 705/37; 705/35
(58) Field of Classification Search
CPC ............................ G06Q 40/02; G06Q 40/025
USPC .............................................. 705/38, 35, 37
See application file for complete search history.

(56) References Cited

U.S. PATENT DOCUMENTS

| | | | |
|---|---|---|---|
| 4,169,285 | A | 9/1979 | Walker |
| 4,648,038 | A | 3/1987 | Roberts et al. |
| 4,739,478 | A | 4/1988 | Roberts et al. |
| 4,742,457 | A | 5/1988 | Leon et al. |
| 4,752,877 | A | 6/1988 | Roberts et al. |
| 4,933,842 | A | 6/1990 | Durbin et al. |
| 5,121,469 | A | 6/1992 | Richards et al. |
| 5,222,019 | A | 6/1993 | Yoshino et al. |
| 5,257,369 | A | 10/1993 | Skeen et al. |
| 5,270,922 | A | 12/1993 | Higgins |
| 5,297,031 | A | 3/1994 | Gutterman et al. |
| 5,297,032 | A | 3/1994 | Trojan et al. |
| 5,305,200 | A | 4/1994 | Hartheimer et al. |
| 5,419,890 | A | 5/1995 | Saidi |
| 5,454,104 | A | 9/1995 | Steidlmayer et al. |

(Continued)

FOREIGN PATENT DOCUMENTS

| | | |
|---|---|---|
| WO | 98/043170 | 10/1998 |
| WO | 01/20530 | 3/2001 |

(Continued)

OTHER PUBLICATIONS

Eoroclear Bank: Lending in the safest environments in the world, 2009, Internt Archives, p. 1-9.*

(Continued)

*Primary Examiner* — Bijendra K Shrestha
(74) *Attorney, Agent, or Firm* — Lowenstein Sandler LLP

(57) ABSTRACT

The present invention is directed to providing borrow coverage services to clients by a conduit lender, while the conduit lender maintains a flat position. The source of supply for the loans is a liquidity pool from existing agent lenders that have enrolled the conduit lender as a borrower.

6 Claims, 5 Drawing Sheets

(56) References Cited

U.S. PATENT DOCUMENTS

| | | | |
|---|---|---|---|
| 5,462,438 A | 10/1995 | Becker et al. | |
| 5,497,317 A | 3/1996 | Hawkins et al. | |
| 5,517,406 A | 5/1996 | Harris et al. | |
| 5,557,798 A | 9/1996 | Skeen et al. | |
| 5,563,783 A * | 10/1996 | Stolfo et al. | 705/7.25 |
| 5,592,379 A | 1/1997 | Finfrock et al. | |
| 5,649,186 A | 7/1997 | Ferguson | |
| 5,675,746 A | 10/1997 | Marshall | |
| 5,689,650 A | 11/1997 | McClelland et al. | |
| 5,706,502 A | 1/1998 | Foley et al. | |
| 5,710,889 A | 1/1998 | Clark et al. | |
| 5,724,593 A | 3/1998 | Hargrave, III et al. | |
| 5,742,775 A | 4/1998 | King | |
| 5,778,157 A | 7/1998 | Oatman et al. | |
| 5,787,402 A | 7/1998 | Potter et al. | |
| 5,806,047 A | 9/1998 | Hackel et al. | |
| 5,806,048 A | 9/1998 | Kiron et al. | |
| 5,819,273 A | 10/1998 | Vora et al. | |
| 5,832,461 A | 11/1998 | Leon et al. | |
| 5,845,266 A | 12/1998 | Lupien et al. | |
| 5,864,827 A | 1/1999 | Wilson | |
| 5,878,404 A | 3/1999 | Stout et al. | |
| 5,880,725 A | 3/1999 | Southgate | |
| 5,890,140 A | 3/1999 | Clark et al. | |
| 5,913,214 A | 6/1999 | Madnick et al. | |
| 5,918,218 A | 6/1999 | Harris et al. | |
| 5,922,044 A | 7/1999 | Banthia | |
| 5,926,792 A | 7/1999 | Koppes et al. | |
| 5,940,810 A | 8/1999 | Traub et al. | |
| 5,944,784 A | 8/1999 | Simonoff et al. | |
| 5,946,667 A | 8/1999 | Tull, Jr. et al. | |
| 5,950,176 A | 9/1999 | Keiser et al. | |
| 5,966,531 A | 10/1999 | Skeen et al. | |
| 5,966,672 A | 10/1999 | Knupp | |
| 5,966,700 A | 10/1999 | Gould et al. | |
| 5,970,479 A | 10/1999 | Shepherd | |
| 5,986,673 A | 11/1999 | Martz | |
| 5,995,943 A | 11/1999 | Bull et al. | |
| 6,006,206 A | 12/1999 | Smith et al. | |
| 6,012,046 A | 1/2000 | Lupien et al. | |
| 6,018,714 A | 1/2000 | Risen, Jr. | |
| 6,018,721 A | 1/2000 | Aziz et al. | |
| 6,023,280 A | 2/2000 | Becker et al. | |
| 6,029,146 A | 2/2000 | Hawkins et al. | |
| 6,029,147 A | 2/2000 | Horadan et al. | |
| 6,035,287 A | 3/2000 | Stallaert et al. | |
| 6,049,783 A | 4/2000 | Segal et al. | |
| 6,052,673 A | 4/2000 | Leon et al. | |
| 6,055,522 A | 4/2000 | Krishna et al. | |
| 6,058,378 A | 5/2000 | Clark et al. | |
| 6,061,662 A | 5/2000 | Makavic | |
| 6,064,984 A | 5/2000 | Ferguson et al. | |
| 6,070,151 A | 5/2000 | Frankel | |
| 6,073,104 A | 6/2000 | Field | |
| 6,073,109 A | 6/2000 | Flores et al. | |
| 6,073,115 A | 6/2000 | Marshall | |
| 6,078,903 A | 6/2000 | Kealhofer | |
| 6,078,914 A | 6/2000 | Redfern | |
| 6,078,956 A | 6/2000 | Bryant et al. | |
| 6,081,774 A | 6/2000 | de Hita et al. | |
| 6,088,685 A | 7/2000 | Kiron et al. | |
| 6,092,056 A | 7/2000 | Tull, Jr. et al. | |
| 6,105,005 A | 8/2000 | Fuhrer | |
| 6,131,082 A | 10/2000 | Hargrave, III et al. | |
| 6,134,600 A | 10/2000 | Liu | |
| 6,148,298 A | 11/2000 | LaStrange et al. | |
| 6,173,270 B1 | 1/2001 | Cristofich et al. | |
| 6,173,276 B1 | 1/2001 | Kant et al. | |
| 6,178,420 B1 | 1/2001 | Sassano | |
| 6,185,567 B1 | 2/2001 | Ratnaraj et al. | |
| 6,195,647 B1 | 2/2001 | Martyn et al. | |
| 6,226,623 B1 | 5/2001 | Schein et al. | |
| 6,233,566 B1 | 5/2001 | Levine et al. | |
| 6,236,972 B1 | 5/2001 | Shkedy | |
| 6,236,977 B1 | 5/2001 | Verba et al. | |
| 6,243,670 B1 | 6/2001 | Bessho et al. | |
| 6,260,021 B1 | 7/2001 | Wong et al. | |
| 6,263,321 B1 | 7/2001 | Daughtery, III | |
| 6,263,335 B1 | 7/2001 | Paik et al. | |
| 6,266,683 B1 | 7/2001 | Yehuda et al. | |
| 6,272,474 B1 | 8/2001 | Garcia | |
| 6,275,229 B1 | 8/2001 | Weiner et al. | |
| 6,278,982 B1 | 8/2001 | Korhammer et al. | |
| 6,282,537 B1 | 8/2001 | Madnick et al. | |
| 6,285,986 B1 | 9/2001 | Andrews | |
| 6,285,989 B1 | 9/2001 | Shoham | |
| 6,304,858 B1 | 10/2001 | Mosler et al. | |
| 6,313,854 B1 | 11/2001 | Gibson | |
| 6,317,726 B1 | 11/2001 | O'Shaughnessy | |
| 6,317,728 B1 | 11/2001 | Kane | |
| 6,321,212 B1 | 11/2001 | Lange | |
| 6,323,881 B1 | 11/2001 | Broulik et al. | |
| 6,332,163 B1 | 12/2001 | Bowman-Amuah | |
| 6,338,055 B1 | 1/2002 | Hagmann et al. | |
| 6,338,068 B1 | 1/2002 | Moore et al. | |
| 6,343,287 B1 | 1/2002 | Kumar et al. | |
| 6,347,307 B1 | 2/2002 | Sandhu et al. | |
| 6,349,291 B1 | 2/2002 | Varma | |
| 6,356,933 B2 | 3/2002 | Mitchell et al. | |
| 6,360,210 B1 | 3/2002 | Wallman | |
| 6,366,908 B1 | 4/2002 | Chong et al. | |
| 6,381,585 B1 | 4/2002 | Maples et al. | |
| 6,381,586 B1 | 4/2002 | Glasserman et al. | |
| 6,385,660 B2 | 5/2002 | Griesemer et al. | |
| 6,389,413 B2 | 5/2002 | Takahashi et al. | |
| 6,389,452 B1 | 5/2002 | Glass | |
| 6,401,080 B1 | 6/2002 | Bigus et al. | |
| 6,408,282 B1 | 6/2002 | Buist | |
| 6,418,417 B1 | 7/2002 | Corby et al. | |
| 6,421,653 B1 | 7/2002 | May | |
| 6,424,980 B1 | 7/2002 | Lizuka et al. | |
| 6,429,868 B1 | 8/2002 | Dehner, Jr. et al. | |
| 6,442,545 B1 | 8/2002 | Feldman et al. | |
| 6,446,110 B1 | 9/2002 | Lection et al. | |
| 6,457,066 B1 | 9/2002 | Mein et al. | |
| 6,460,021 B1 | 10/2002 | Kirksey | |
| 6,480,882 B1 | 11/2002 | McAdam et al. | |
| 6,489,954 B1 | 12/2002 | Powlette | |
| 6,490,584 B2 | 12/2002 | Barrett et al. | |
| 6,493,681 B1 | 12/2002 | Tertitski et al. | |
| 6,510,406 B1 | 1/2003 | Marchisio | |
| 6,516,303 B1 | 2/2003 | Wallman | |
| 6,516,308 B1 | 2/2003 | Cohen | |
| 6,523,022 B1 | 2/2003 | Hobbs | |
| 6,556,987 B1 | 4/2003 | Brown et al. | |
| 6,564,250 B1 | 5/2003 | Nguyen | |
| 6,581,056 B1 | 6/2003 | Rao | |
| 6,581,062 B1 | 6/2003 | Draper et al. | |
| 6,598,028 B1 | 7/2003 | Sullivan et al. | |
| 6,601,044 B1 | 7/2003 | Wallman | |
| 6,611,825 B1 | 8/2003 | Billheimer et al. | |
| 6,615,187 B1 | 9/2003 | Ashenmil et al. | |
| 6,629,097 B1 | 9/2003 | Keith | |
| 6,631,373 B1 | 10/2003 | Otani et al. | |
| 6,633,868 B1 | 10/2003 | Min et al. | |
| 6,711,554 B1 | 3/2004 | Salzmann et al. | |
| 7,191,392 B1 | 3/2007 | Coar | |
| 7,212,993 B1 | 5/2007 | Bodurtha et al. | |
| 7,222,094 B2 | 5/2007 | Ross | |
| 7,233,921 B2 | 6/2007 | Takeda et al. | |
| 7,249,037 B2 | 7/2007 | Koppes et al. | |
| 7,249,075 B1 | 7/2007 | Altomare et al. | |
| 7,249,077 B2 | 7/2007 | Williams et al. | |
| 7,249,095 B2 | 7/2007 | Davies et al. | |
| 7,272,580 B2 | 9/2007 | Brady et al. | |
| 7,313,541 B2 | 12/2007 | Wise et al. | |
| 7,349,881 B1 * | 3/2008 | Lockwood | 705/37 |
| 7,392,210 B1 | 6/2008 | MacKay et al. | |
| 7,392,212 B2 | 6/2008 | Hancock et al. | |
| 7,567,935 B2 * | 7/2009 | Tell et al. | 705/37 |
| 2001/0011241 A1 | 8/2001 | Nemzow | |
| 2001/0011242 A1 | 8/2001 | Allex et al. | |
| 2001/0018674 A1 | 8/2001 | Schein et al. | |
| 2001/0025264 A1 | 9/2001 | Deaddio et al. | |

(56) References Cited

U.S. PATENT DOCUMENTS

| | | |
|---|---|---|
| 2001/0032217 A1 | 10/2001 | Huang |
| 2001/0042034 A1 | 11/2001 | Elliott |
| 2001/0043235 A1 | 11/2001 | Best et al. |
| 2001/0044771 A1 | 11/2001 | Usher et al. |
| 2001/0056397 A1 | 12/2001 | Kelly et al. |
| 2001/0056398 A1 | 12/2001 | Scheirer |
| 2002/0002530 A1 | 1/2002 | May |
| 2002/0004777 A1 | 1/2002 | Foster et al. |
| 2002/0007335 A1 | 1/2002 | Millard et al. |
| 2002/0007358 A1 | 1/2002 | Johnson et al. |
| 2002/0013753 A1 | 1/2002 | Marks de Chabris et al. |
| 2002/0013862 A1 | 1/2002 | Orchard et al. |
| 2002/0016762 A1 | 2/2002 | Felibogen et al. |
| 2002/0016819 A1 | 2/2002 | Sugimoto et al. |
| 2002/0018077 A1 | 2/2002 | Powlette |
| 2002/0019805 A1 | 2/2002 | Kalotay |
| 2002/0022956 A1 | 2/2002 | Ukranincsky et al. |
| 2002/0023053 A1 | 2/2002 | Szoc et al. |
| 2002/0026405 A1 | 2/2002 | Haar |
| 2002/0026449 A1 | 2/2002 | Azencott |
| 2002/0026462 A1 | 2/2002 | Shotton, Jr. et al. |
| 2002/0029183 A1 | 3/2002 | Vlahoplus et al. |
| 2002/0032644 A1 | 3/2002 | Corby et al. |
| 2002/0035561 A1 | 3/2002 | Archer et al. |
| 2002/0042767 A1 | 4/2002 | Kwan |
| 2002/0046154 A1 | 4/2002 | Pritchard |
| 2002/0046158 A1 | 4/2002 | Kelly et al. |
| 2002/0049665 A1 | 4/2002 | Solomon et al. |
| 2002/0049666 A1 | 4/2002 | Reuter et al. |
| 2002/0054115 A1 | 5/2002 | Mack et al. |
| 2002/0059129 A1 | 5/2002 | Kemp, II et al. |
| 2002/0059141 A1 | 5/2002 | Davies et al. |
| 2002/0065752 A1 | 5/2002 | Lewis |
| 2002/0065755 A1 | 5/2002 | Shlafman et al. |
| 2002/0069157 A1 | 6/2002 | Jordan |
| 2002/0069160 A1* | 6/2002 | Olin ........................ 705/38 |
| 2002/0073007 A1 | 6/2002 | Ayache |
| 2002/0078253 A1 | 6/2002 | Szondy et al. |
| 2002/0087373 A1 | 7/2002 | Dickstein et al. |
| 2002/0087391 A1 | 7/2002 | Williams |
| 2002/0087454 A1 | 7/2002 | Calo et al. |
| 2002/0087455 A1 | 7/2002 | Tsagarakis et al. |
| 2002/0087457 A1 | 7/2002 | Madeley et al. |
| 2002/0099646 A1 | 7/2002 | Agarwal et al. |
| 2002/0099656 A1 | 7/2002 | Poh Wong |
| 2002/0101120 A1 | 8/2002 | Akama et al. |
| 2002/0107774 A1 | 8/2002 | Henninger et al. |
| 2002/0112056 A1 | 8/2002 | Baldwin et al. |
| 2002/0123947 A1 | 9/2002 | Yuste et al. |
| 2002/0130868 A1 | 9/2002 | Smith |
| 2002/0138390 A1 | 9/2002 | May |
| 2002/0143673 A1 | 10/2002 | Hitchings et al. |
| 2002/0147671 A1 | 10/2002 | Sloan et al. |
| 2002/0152154 A1 | 10/2002 | Rothman et al. |
| 2002/0152156 A1 | 10/2002 | Tyson-Quah |
| 2002/0156658 A1 | 10/2002 | Selesny et al. |
| 2002/0156719 A1 | 10/2002 | Finebaum et al. |
| 2002/0161692 A1 | 10/2002 | Loh et al. |
| 2002/0161853 A1 | 10/2002 | Burak et al. |
| 2002/0169707 A1 | 11/2002 | Koek et al. |
| 2002/0174043 A1 | 11/2002 | Gilbert et al. |
| 2002/0178096 A1 | 11/2002 | Marshall |
| 2002/0184132 A1 | 12/2002 | Foster |
| 2002/0184237 A1 | 12/2002 | McFeely |
| 2002/0194097 A1 | 12/2002 | Reitz |
| 2002/0194114 A1 | 12/2002 | Erdmier |
| 2002/0198808 A1 | 12/2002 | Myers |
| 2002/0198818 A1 | 12/2002 | Scott et al. |
| 2002/0198833 A1 | 12/2002 | Wohlstadter |
| 2003/0004942 A1 | 1/2003 | Bird |
| 2003/0009406 A1 | 1/2003 | Ross |
| 2003/0009411 A1 | 1/2003 | Ram et al. |
| 2003/0018558 A1 | 1/2003 | Heffner et al. |
| 2003/0018714 A1 | 1/2003 | Mikhailov et al. |
| 2003/0028456 A1 | 2/2003 | Yolles |
| 2003/0033212 A1 | 2/2003 | Sandhu et al. |
| 2003/0037174 A1 | 2/2003 | Lavin et al. |
| 2003/0065594 A1 | 4/2003 | Murphy |
| 2003/0066025 A1 | 4/2003 | Garner et al. |
| 2003/0066032 A1 | 4/2003 | Ramachandran et al. |
| 2003/0078869 A1 | 4/2003 | Williams |
| 2003/0083975 A1 | 5/2003 | O'Grady et al. |
| 2003/0088496 A1 | 5/2003 | Potrowski |
| 2003/0093360 A1 | 5/2003 | May |
| 2003/0093362 A1 | 5/2003 | Tupper et al. |
| 2003/0093565 A1 | 5/2003 | Berger et al. |
| 2003/0105806 A1 | 6/2003 | Gayle et al. |
| 2003/0105981 A1 | 6/2003 | Miller et al. |
| 2003/0115122 A1 | 6/2003 | Slater et al. |
| 2003/0126063 A1 | 7/2003 | Reuter |
| 2003/0126068 A1 | 7/2003 | Hauk et al. |
| 2003/0126069 A1 | 7/2003 | Cha |
| 2003/0126117 A1 | 7/2003 | Megiddo et al. |
| 2003/0140035 A1 | 7/2003 | Burrows |
| 2003/0149653 A1 | 8/2003 | Penney |
| 2003/0154071 A1 | 8/2003 | Shreve |
| 2003/0154158 A1 | 8/2003 | Martyn et al. |
| 2003/0154306 A1 | 8/2003 | Perry |
| 2003/0158949 A1 | 8/2003 | Miller et al. |
| 2003/0163401 A1 | 8/2003 | Dines et al. |
| 2003/0188255 A1 | 10/2003 | Shimizu et al. |
| 2003/0220861 A1 | 11/2003 | Broms et al. |
| 2003/0220868 A1 | 11/2003 | May |
| 2003/0229718 A1 | 12/2003 | Tock et al. |
| 2003/0233459 A1 | 12/2003 | Miller et al. |
| 2003/0236862 A1 | 12/2003 | Miller et al. |
| 2003/0236957 A1 | 12/2003 | Miller et al. |
| 2004/0039666 A1 | 2/2004 | Fudali et al. |
| 2004/0039692 A1 | 2/2004 | Shields et al. |
| 2004/0064397 A1 | 4/2004 | Lynn et al. |
| 2004/0068559 A1 | 4/2004 | Shaw |
| 2004/0078248 A1 | 4/2004 | Altschuler |
| 2004/0103003 A1 | 5/2004 | Mayers et al. |
| 2004/0128169 A1 | 7/2004 | Lusen |
| 2004/0148247 A1 | 7/2004 | Miller et al. |
| 2004/0148259 A1 | 7/2004 | Reiners et al. |
| 2004/0162775 A1 | 8/2004 | Winklevoss et al. |
| 2004/0167850 A1 | 8/2004 | Dreyer et al. |
| 2004/0193536 A1 | 9/2004 | Marlowe-Noren |
| 2004/0215553 A1 | 10/2004 | Gang et al. |
| 2004/0220885 A1 | 11/2004 | Salzmann et al. |
| 2004/0225536 A1 | 11/2004 | Schoen et al. |
| 2004/0225596 A1 | 11/2004 | Kemper et al. |
| 2005/0010517 A1 | 1/2005 | Lowenstein et al. |
| 2005/0027646 A1 | 2/2005 | Hall et al. |
| 2005/0060256 A1 | 3/2005 | Peterson et al. |
| 2005/0065869 A1* | 3/2005 | Rabe et al. .................. 705/37 |
| 2005/0071265 A1 | 3/2005 | Nishimaki |
| 2005/0086148 A1 | 4/2005 | Woodruff et al. |
| 2005/0086170 A1 | 4/2005 | Rao |
| 2005/0102213 A1 | 5/2005 | Savasoglu et al. |
| 2005/0102214 A1 | 5/2005 | Speth et al. |
| 2005/0108118 A1 | 5/2005 | Malackowski et al. |
| 2005/0216387 A1 | 9/2005 | Barany et al. |
| 2006/0229973 A1 | 10/2006 | Sternberg |
| 2006/0259419 A1 | 11/2006 | Monsen et al. |
| 2007/0005478 A1 | 1/2007 | Lambe |
| 2007/0043654 A1 | 2/2007 | Libman |
| 2007/0067229 A1* | 3/2007 | Parthasarathy ................. 705/35 |
| 2008/0052214 A1* | 2/2008 | Martinez et al. ............... 705/37 |
| 2008/0228661 A1* | 9/2008 | Silitch et al. ............... 705/36 R |
| 2009/0276370 A1* | 11/2009 | Olson et al. ............... 705/36 R |
| 2010/0005030 A1* | 1/2010 | DePetris et al. .............. 705/80 |
| 2010/0169205 A1* | 7/2010 | Labuszewski et al. .......... 705/37 |
| 2010/0274703 A1* | 10/2010 | Olson et al. ................. 705/37 |
| 2011/0078086 A1* | 3/2011 | Byrne ......................... 705/316 |
| 2011/0106690 A1* | 5/2011 | Fisher ......................... 705/38 |

FOREIGN PATENT DOCUMENTS

| | | |
|---|---|---|
| WO | 01/37540 | 5/2001 |
| WO | 01/57716 | 8/2001 |
| WO | 01/59670 | 8/2001 |
| WO | 02/03774 | 1/2002 |

(56) References Cited

FOREIGN PATENT DOCUMENTS

| WO | 02/14991 | | 2/2002 | |
|---|---|---|---|---|
| WO | 02/054189 | | 7/2002 | |
| WO | 02/056146 | | 7/2002 | |
| WO | 02/063516 | | 8/2002 | |
| WO | 02/065278 | | 8/2002 | |
| WO | 02/065286 | | 8/2002 | |
| WO | 03/012588 | | 2/2003 | |
| WO | 03/030013 | | 4/2003 | |
| WO | 03/032158 | | 4/2003 | |
| WO | 03/065256 | | 8/2003 | |
| WO | 03/102733 | | 12/2003 | |
| WO | WO 2010/014911 | * | 7/2009 | ............ G06Q 40/00 |

OTHER PUBLICATIONS

Euroclear Bank: Lending in the safest environments in the world, 2009, Internt Archives, p. 1-9.*
Harrison et al.: Securities Borrowing and Lending, Dec. 2004, Hedge Fund Monthly, pp. 1-6.*
Ferrell, Richard L.: Best laid plans may not protect collateral challenge, pitfalls to lender's security, , Apr. 10, 2008, Turnaround Management Association (TMA), pp. 1-9.*
Norton Rose Fulbright: Securities lending transactions for German Investment funds, Aug. 2008, pp. 1-17.*
RBC Dexia Investor Services: Securitie Lending, Special Report, 2007, Q2, pp. 59-70.*
Berthier Ribeiro-Neto et al, Top-Down Extraction of Semi-Structured Data, String Processing and Information Retrieval Symposium, 1999 and Int'l Workshop on Groupware, pp. 176-183 (Sep. 24, 1999).
Bill Martin, Interview: Cormac L. Kinney, Chairman and Co-Founder, NeoVision, eFinance Insider, Aug. 16, 2001, http://www.efinanceinsider.com/email81601 (last visited Aug. 2, 2005).
Commodity Futures Trading Commission, CFTC Glossary ("Co"), A Guide to the Language of the Futures Industry, http://www.cftc.gov/educationcenter/glossary/glossary_co.html (last visited Nov. 18, 2008).
Czejdo et al, Automatic generation of ontology based annotations in XML and their use in retrieval systems, Proc. 1st Int'l Conf. on Web Information Systems Engineering, vol. 1 pp. 296-300 (Jun. 21, 2000) (Abstract).
David Elkayam et al, Using Indexed Bonds to Estimate a Central Bank Reaction Function (Apr. 11, 2002).
David Pilla, In case of emergency; contingent capital, Best's Rev., vol. 102, p. 59 (Sep. 1, 2001).
Freddie Mac, Document Custody Procedure Overview (Dec. 2003).
Gary W. Emery et al, The Measurement of Liquidity, 20 J. Acct. Res. 290 (1982).
George Chacko et al, Cephalon, Inc. taking risk management theory seriously, 60 J. Fin. Econ. 2 (May 2001).
Giuseppe Mano et al, A framework for adaptive mail classification, Proc. 14th Int'l Conf. on Tools with Artificial Intelligence, pp. 387-392 (Nov. 6, 2002) (Abstract).
Helen Huntley, Class B Mutual Fund Shares Face Increasing Scrutiny, St. Petersburg Times, Feb. 6, 2005, at 1D.
Henry Kus, Contingent capital: just in time capital management sets a new standard, Corporate Finance, p. 30 (Oct. 1, 2002).
Hewlett-Packard, x4queview, Mar. 1992.
Ian H. Witten et al, Text mining: a new frontier for lossless compression, Proc. Data Compression Conf., pp. 198-207 (Mar. 31, 2003) (Abstract).
IBM Corp., Strict Read Order Control for a Queing System, IBM Technical Disclosure Bulletin, Mar. 2002.
Investing Systems Network, Recommended Software, http://www.investing-systems.com/software.html (last visited Oct. 21, 2002).
Inxight Software, Inc., Intelliseek and Inxight Partner to Provide New Business Intelligence Solutions, http://www.inxight.com/news/021029_intelliseek.html (last visited Nov. 2002).
Jim Ericson, Softwerc releases patent-pending "URL Generator" for distribution of Web-based content, applications, http://www.portalsmag.com/articles/default.asp?ArticleID=4191 (Nov. 15, 2002).
Jussi Myllymaki, Effective Web Data Extraction with Standard XML Technologies, http://www10.org/cdrom/papers/102 (May 5, 2001).
Lencom, Fast Email Extractor 4.4, http://www.lencom.com/FEE.html (last visited Sep. 2003).
Ming Fan et al, The Internet and the Future of Financial Markets; Industry Trend or Event, 43 Comm. ACM 82 (Nov. 1, 2000).
National Association of Securities Dealers, NASD Investor Alert, Class B Mutual Fund Shares: Do They Make the Grade?, Jun. 25, 2003, http://web.archive.org/web/20030724111858/www.nasd.com/Investor/Alerts/alert_classb_funds.htm.
Novell, Inc., Beginning of Viewing Information and Viewing Basic Information about a Print Job, 5 Managing Print Queues, Jun. 1, 1993.
Pavel P. Calado et al, The web-DL environment for building digital libraries from the web, Proc. Joint Conf. on Digital Libraries, pp. 346-357 (May 31, 2003) (Abstract).
Rachel Emma Silverman, A New Strategy for Giving Away Your Money, Wall St. J., Oct. 6, 2004, at D1.
Rising to the Challenge of Global STP, Global Investor, Nov. 1999, at 51.
Ron White, How Computers Work 36-37, 267-68, 271 (4th ed. 1998).
Rupali Sharma et al, Phrase-based text representation for managing the Web documents, Proc. 2003 Int'l Conf. Computers and Communications, Information Technology: Coding and Computing Proceedings, pp. 165-169 (Apr. 30, 2003) (Abstract).
Sally Roberts, Top Priority on Bottom Line: More Companies Seeking to Manage Business Risks, Bus. Ins., Mar. 20, 2000, at 3.
Securities Market Practice Group, Block Trades Market Practice (Apr. 2003).
STP in the Bond Market?—Not Yet, But Electronic Initiatives are Gearing Up, Wall St. & Tech., Dec. 1, 2002, at 20.
Sunny K.S. Lam et al, Querying Web data—the WebQA approach, Proc. 3d Int'l Conf. on Web Information Systems Engineering, pp. 139-148 (Dec. 14, 2002) (Abstract).
TradeWeb's STP Vision, Euromoney, Feb. 1, 2003, at S6.
V. Carchiolo et al, Structuring the Web, 11th Int'l Workshop on Database and Expert Systems Applications, p. 1123 (Sep. 8, 2000) (Abstract).
Various Authors, Financial Information eXchange, Gen. Conf. (Oct. 7, 1998).
Wolfgang May, Modeling and querying structure and contents of the Web, Proc. 10th Int'l Workshop on Database and Expert Systems Applications, pp. 721-725 (Sep. 3, 1999) (Abstract).

* cited by examiner

SYSTEM AND METHOD FOR PROVIDING BORROW COVERAGE SERVICES TO SHORT SELL SECURITIES

This application claims priority to U.S. Provisional Application No. 61/305,896, filed Feb. 18, 2010, the contents of which are hereby incorporated by reference in its entirety.

BACKGROUND OF THE INVENTION

The present invention relates generally to the field of lending, and more particularly, lending conducted through a conduit lender so as to enable the conduit lender to maintain a flat position. In preferred embodiments, the present invention is directed to systems and methods for providing borrow coverage services to clients short selling securities.

A short sale of a security is a transaction in which a seller borrows securities in order to sell the borrowed securities in anticipation of a decrease in the market price. The seller will then in turn buy the security back at a lower price to earn a profit, which is calculated as the difference between the initial selling price and the repurchase price, and return the securities to the lender.

Of course, there are financial risks involved with this strategy, as with any investment strategy. With short sales, if the price of the securities increases, the seller will take a loss on the sale. Also, when borrowing the securities, the interest rates offered by typical lenders in short sales, e.g., prime brokerage firms, may be extremely high due to the risk involved. While there are lenders which offer competitive rates, there are some borrowers that cannot interface directly with certain lenders that are in a position to provide more competitive loan rates. However, these same lenders may interface directly with higher institutions carrying a strong credit rating (e.g., a large banking entity) in which the foregoing disadvantaged borrowers have established relationships. Accordingly, there is a desire to leverage the foregoing established relationships between higher institutions and disadvantaged borrowers to allow for the availability of more competitive loan rates, particularly in the arena of borrow coverage for clients of the higher institution engaged in the short selling of securities.

The solution presented by the present invention is based on a "conduit lending" or "riskless principal" transaction, whereby a loan made by lenders to the banking entity is onward delivered to borrowers, and whereby the collateral delivered by borrowers to the banking entity is onward delivered to lenders, thereby perfecting a net flat position for the banking entity.

SUMMARY OF THE INVENTION

The object of the present invention is to provide borrow coverage services to clients while maintaining a flat position. In providing borrow coverage services, a principal agent, or conduit lender, executes loans and borrows to enable e.g., short sellers to settle their trades. The conduit lender's position remains flat however, because the source of supply is a liquidity pool from existing agent lenders that have enrolled the conduit lender as a borrower.

Therefore, in certain embodiments, the present invention is directed to a method of executing a loan transaction comprising: receiving, through a computer, a loan request from a borrower; receiving, through the computer, assets from a plurality of lenders; verifying, through the computer, that the assets received from the plurality of lenders satisfies the loan request; and providing the borrower, through the computer, with sufficient assets to satisfy the loan request.

In certain other embodiments, the present invention is directed to a method for executing a loan transaction comprising: receiving, through a computer, a loan request from a borrower; storing, in the computer, details of the loan request; receiving, through the computer, assets from a plurality of lenders; storing, in the computer, details of the assets from the plurality of lenders; storing, through the computer, the assets from the plurality of lenders in a pool of assets; receiving from the borrower, through the computer, collateral for the loan request, storing, through the computer, the collateral in a pool of collateral; matching, through the computer, assets from the pool of assets which satisfy the loan request and collateral from the pool of collateral which satisfies the lenders from the plurality of lenders; providing the borrower, through the computer, with sufficient assets to satisfy the loan request; and providing the matched lenders with collateral from the pool of collateral.

In certain embodiments, the present invention is directed to a system for executing a loan transaction comprising: a programmable computer; a database; and one or more processors coupled to the programmable computer and the database, the processors configured to: receive a loan request from a borrower; store details of the loan request; receive assets from a plurality of lenders; store details of the assets from the plurality of lenders; store the assets from the plurality of lenders in a pool of assets; select appropriate collateral assets for the loan request from a pool of eligible assets owned by the borrower store the collateral in a collateral account per each relevant borrower; pledge assets from the collateral account into segregated escrow accounts which satisfies the lenders from the plurality of lenders; provide the borrower, through the computer, with sufficient assets to satisfy the loan request; and provide the lenders, through the computer, with information on the pledged collateral from the pool of collateral.

In other embodiments, the present invention is directed to a system for executing a loan transaction comprising: a programmable computer; one or more processors coupled to the programmable computer and coupled to: a principal component configured to receive a loan request from a borrower, receive assets from a lender, and transmit assets from the lender to the borrower; a lending component configured to manage assets of the lender; and a custody component configured to store assets.

In certain embodiments, the borrower may provide collateral in the form of cash, as well as equities, for their borrow requirements.

In other embodiments, the system and method of the present invention is further configured to enable trade capture, trade maintenance, clearance and collateral management, stock record, accounting, corporate finance reporting and credit risk reporting.

DETAILED DESCRIPTION

As previously mentioned, the lending system and method described herein allows the conduit lender to maintain a net-flat position, while offering more competitive rates to borrowers who may not have had access to such rates. Further advantages provided by the present invention include, but are not limited to, the ability to lend as a principal while capitalizing on a P&L spread between short seller and lender, the ability to provide a low intraday credit risk profile, the ability to provide transparency between bulk-level loans and principal loan breakdown, the ability to provide securities and cash collateral eligibility, the ability to provide collateral management at a principal account level, the ability to provide books and record keeping at a principal account level, the ability to provide credit exposure monitoring and the ability to provide financial control reporting.

Figure 1:
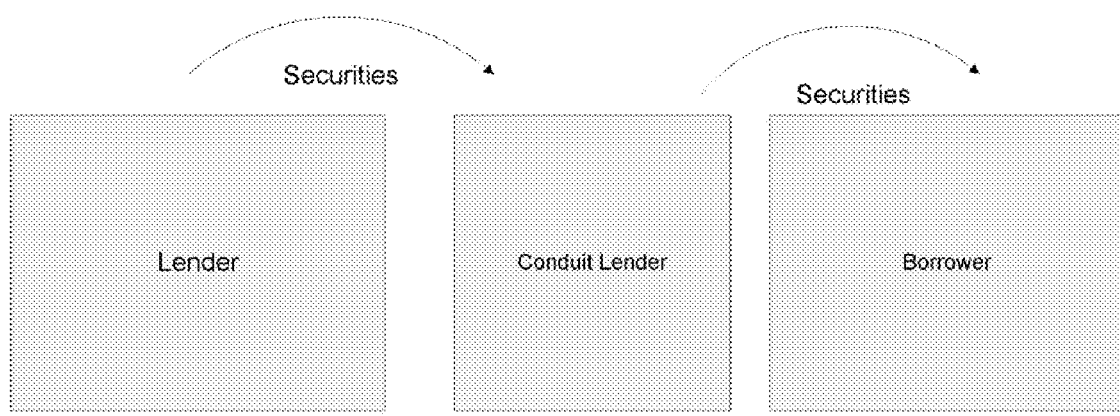
FIG. 1 depicts the flow of a loan transaction and collateral allocation according to the method of the present invention.

Referring now to FIG. 1 which depicts a basic ground level view of the present invention, a principal agent, or conduit lender, preferably a banking entity, receives a loan from a agent lender, and then in turn passes this loan on to the borrower. For short sales of securities, the loan comprises the securities. The conduit lender of the present invention can offer a competitive rate to the borrower, as compared to e.g., prime brokerage firms, not only because it may be, e.g., a large banking entity, but also because there is minimal risk involved for the conduit lender.

Figure 2:
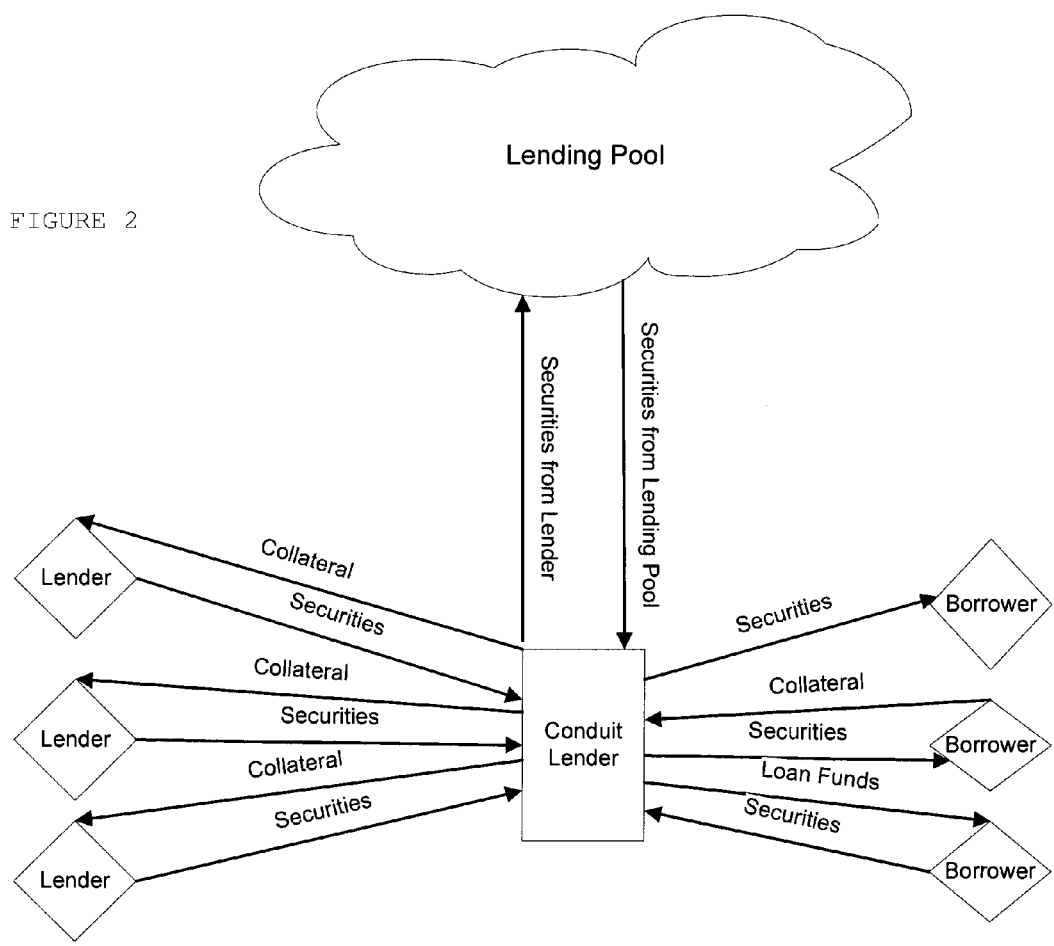
FIG. 2 depicts the flow of securities and collateral according to certain embodiments of the present invention.

Referring now to FIG. 2 which depicts a more preferred embodiment of the present invention, multiple agent lenders provide loans to the conduit lender, thereby creating a liquidity pool which is used to fulfill a loan request from a borrower. This is advantageous because it is not necessary that a borrower's needs be fulfilled by a single agent lender. For example, a borrower seeks to borrow 50 shares of a security and lender A provides 10 shares, lender B provides 10 shares, and lender C provides 30 shares to the lending pool. The conduit lender will then take 50 shares from the lending pool to give to the borrower to fulfill the request.

In preferred embodiments, the borrower gives collateral for the loan, which can be in the form of cash or securities. Preferably, collateral is placed into appropriate collateral accounts. The conduit lender will then pass on the collateral to agent lenders who have supplied loans. Using the example above, collateral will be divided up among lenders A, B and C in a sufficient amount to cover the sum of the loan each lender provided.

In order to execute the loan transaction, the conduit lender has access, either directly or indirectly, to all components of the systems of the present invention. As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enable the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Figure 3A:
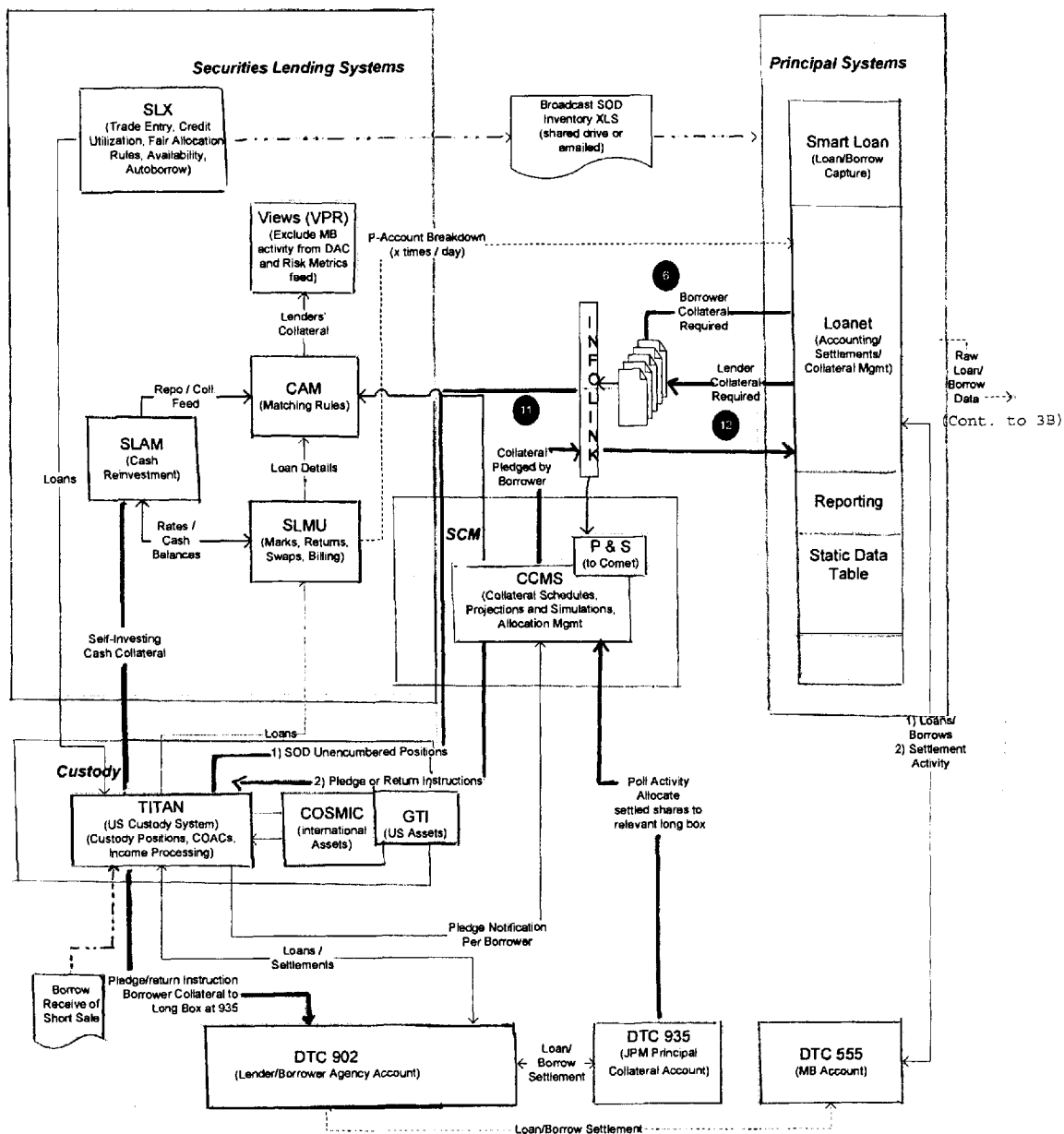
FIGS. 3A and 3B depict the architecture of the system for executing a loan transaction according to certain embodiments of the present invention.
Figure 3B:
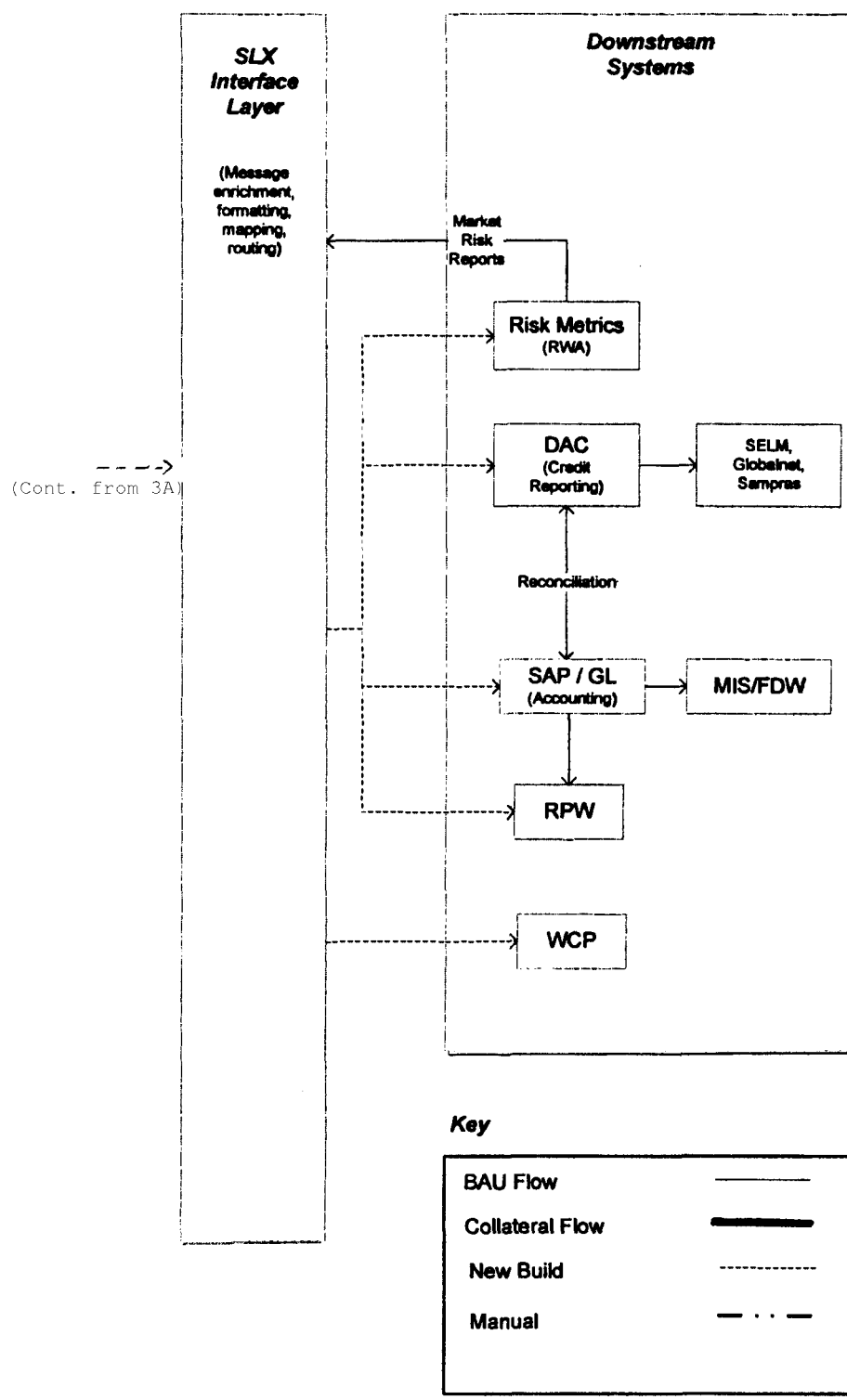

In preferred embodiments of the present invention, the systems are divided into three subsystems, i.e., the principal systems, the lending systems and the custody systems. Optionally, a collateral management systems component and a component of downstream systems may also be included. FIGS. 3A and 3B depict the relationship between these subsystems.

Principal Systems

The conduit lender has direct access to the principal systems of the present invention. In preferred embodiments, the principal systems comprise one or more programs configured to calculate and manage borrow requirements and inventory available for securities lending, loan/borrow trade instruction, short sale authorizations, collateral management, accounting and settlement, reporting and data management.

Lending Systems

An agent lender, acting on behalf of agent lenders, has direct access to the lending systems of the present invention, which are configured to communicate with the principal systems. In preferred embodiments, the lending systems comprise one or more programs configured to, e.g., automate trade entry, utilize credit, provide allocation of assets, provide market rules, availability of assets, reinvest cash, and match collateral, all of which can be performed by a single component or by multiple components. For example, in preferred embodiments, the lending systems comprise a component which is capable of operating as a front end application for agent loan booking, comprising an application suite configured to provide various reporting and tracking functions including, but not limited to, client reporting, collateral reporting, profitability determinations and trading activity. The lending systems also preferably comprise a component which operates as an application configured to allocate collateral to individual escrows. Escrows may be collateral accounts held on behalf of the lender. However, unlike traditional escrow accounts used to hold escrow from a pool of lenders, the escrow accounts utilized in the present invention may be created to hold collateral for a lender pertaining to a specific borrower. In addition, the lending systems also preferably comprise a component which operates as a trade maintenance utility for agent loan transactions. The lending systems also preferably comprise a component which operates as tool for reinvesting collateral.

Custody Systems

Both the principal systems and the lending systems are configured to communicate with the custody systems. In preferred embodiments, the custody systems comprise components for management of U.S. assets (TITAN) and an internal custody management system for international customers holding U.S. assets in custody (COSMIC), the COSMIC system having a front end (GTI) for interacting with TITAN. The custody systems will have access to the lender/borrower position accounts and operational staff may book trades directly into these accounts. Collateral Management System In embodiments where collateral is being received from the borrower, a collateral management system may be incorporated into the system. The collateral management system may be comprised of an operations application (CCMS) component for performing daily collateral operations, a simulation component (P&S) and an interface application (Infolink) componentThe P&S component may be an application utilized by the collateral management system to determine, e.g., securities to pledge based on available assets and as inventory management of what has already been pledged.

Downstream Systems

In certain embodiments, the principal systems may also be configured to be in communication with downstream systems, preferably through an interface layer which operates message enrichment, formatting and routing. The downstream systems may comprise programs configured to provide market risk reports, credit reporting, reconciliation of accounts and accounting. For example, the downstream system may comprise an Extract, Transform and Load (ETL) component, a credit exposure data capture (DAC) component, a Securities Exposure Limits Monitoring (SELM) component, and a General Ledger (SAP/GL) component. The ETL component may operate as an application configured to provide information to corporate downstream systems directed at accounting, corporate finance, credit and market risk. The DAC component may operate as an application configured to consolidate data for credit risk reporting.

EXAMPLE 1

Figure 4:
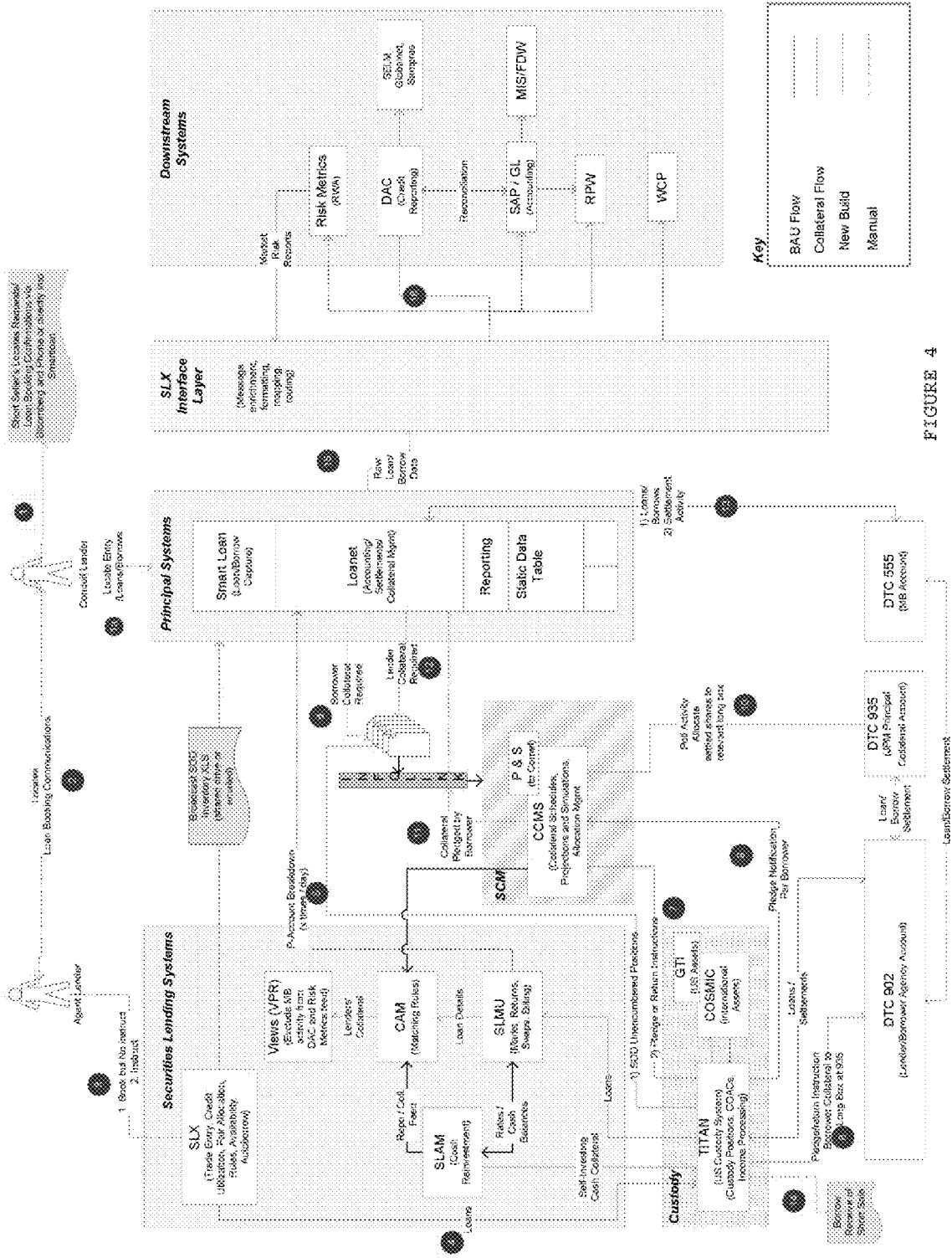
FIG. 4 depicts a flow chart for executing a loan transaction using the systems described herein.

Referring now to FIG. 4, an exemplary embodiment of the present invention, the initiation of a loan locate and loan booking function is represented at integration points 1, 2 and 3 in the appended drawing. A borrower transmits a request for a loan transaction to the conduit lender, which may be represented by the aforementioned banking entity. The loan transaction request may be transmitted by a computer module configured to communicate on behalf of the borrower. Similarly, the conduit lender may be a computer module configured to process loan transaction requests and execute corresponding actions relating to the same. The conduit lender books principal transactions (i.e., borrow and loan) into at least one principal system, which is represented at integration point 1a of FIG. 4. Requests are filled and executed by the conduit lender from an inventory that is sourced from a lending pool, but loans may not be released to clearance until collateralization checks.

In the present invention, the conduit lender executes loans through at least one agent lender. In preferred embodiments, the conduit lender may receive reports on an hourly, daily, or weekly basis showing assets available for lending from all agent lenders. In embodiments where the assets are placed into a lending or liquidity pool, the reports will detail the contents of the pool. Similar to the principal system of the conduit lender, the lending systems acting on behalf of the agent lenders may be configured to book loans with the conduit lender and execute corresponding actions relating to the same. In certain embodiment, loans booked on behalf of the agent lender may be booked to the conduit lender at a street-side bulk level, but the trade to the borrower is held and not cleared until either the lending system confirms the transaction with the conduit lender, or the conduit lender confirms the transaction through automated verification.

Referring back to FIG. 4, loans secured through a agent lender are processed by a series of lending systems, represented at integration point 4. The lending systems are further configured to communicate with a custody and clearing management system, represented collectively at integration points 7, 8, 9, 10, 13 and 14. The custody and clearing management system links to DTC to instruct actual movement of securities and collateral between custody accounts.

Borrow requests may be facilitated through multiple lenders. Accordingly, at integration point 5 of FIG. 4, transaction details are broken down by customer account and flowed a few times per day to at least one of the principal systems illustrated at integration point 1a. The principal systems are also configured to breakdown the street-side loans into loan components by specific lender. For example, the process may be compiled as follows: (i) execute a street-side loan in a principal system; (ii) provide feed containing components of the loan; and (iii) break down, by specific lenders, the street-side loan using the feed containing the components of the loan.

Required collateral values are calculated per borrower and lender by at least one of the principal systems. An internal suite of applications configured to perform securities collateral management are provided at integration points 6, 11 and 12 in FIG. 4. In equity collateral scenario, for example, the collateral management process may be compiled as follows: (i) calculate the total required collateral value per lender-borrower combo, per security; (ii) output results of calculation and transmit the same to CCMS component; and (iii)

receive data from CCMS component showing how much is in Escrow (per lender-borrower combo) after CCMS performs collateral management operations.

As discussed earlier, an interface application (Infolink) will be incorporated into the architecture illustrated in FIG. 4 to regulate file transfers, data mapping and translations pertaining to management of collateral, as well as other related systems. Raw loan and borrow data is further utilized by downstream systems at integration points 15 and 16 in FIG. 4.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed:

1. A computer implemented method, the method comprising the steps of:
   receiving, at a programmed computer, a loan request and corresponding collateral from a borrower;
   receiving, at the programmed computer, an allocation of securities from a plurality of lenders and storing the allocation of securities in a pool of securities;
   identifying, at the programmed computer, a number of shares of a security allocated from each of the plurality of lenders available to service the loan request;
   determining, at the programmed computer, a total number of shares needed from the allocation of securities in the pool of securities to satisfy the loan request;
   selecting, at the programmed computer, two or more lenders from the plurality of lenders to service the loan request, wherein the number of shares received from each of the two more lenders collectively equal the total number of shares needed to satisfy the loan request;
   distributing, using the programmed computer, the collateral received from the borrower proportionally to the two or more lenders selected based on the number of shares allocated from each lender, wherein a separate escrow account is associated with each lender for receiving the proportional distribution of collateral owed to each lender; and
   providing, using the programmed computer, the borrower with the securities from the two or more lenders selected to service the loan request.

2. The method of claim 1, wherein the collateral is securities or cash.

3. The method of claim 1, wherein the steps are performed by a conduit lender system.

4. The method of claim 3, wherein the conduit lender system is associated with a banking entity.

5. A computer system, comprising:
   a computer-readable memory; and
   a processor communicatively coupled to the computer-readable memory, the processor programmed to:
      receive a loan request and corresponding collateral from a borrower;
      receive an allocation of securities from a plurality of lenders and storing the allocation of securities in a pool of securities;
      identify a number of shares of a security allocated from each of the plurality of lenders available to service the loan request;
      determine a total number of shares needed from the allocation of securities in the pool of securities to satisfy the loan request;
      select two or more lenders from the plurality of lenders to service the loan request, wherein the number of shares received from each of the two or more lenders collectively equal the total number of shares needed to satisfy the loan request;
      distribute the collateral received from the borrower proportionally to the two or more lenders selected based on the number of shares allocated from each lender, wherein a separate escrow account is associated with each lender for receiving the proportional distribution of collateral owed to each lender; and
      provide the borrower with the securities from the two or more lenders selected to service the loan request.

6. A non-transitory computer-readable storage medium carrying one or more sequences of instructions for implementing a method, wherein execution of the one or more sequences of instructions by one or more computers causes the one or more computers to perform the steps of:
   receiving a loan request and corresponding collateral from a borrower;
   receiving an allocation of securities from a plurality of lenders and storing the allocation of securities in a pool of securities;
   identifying a number of shares of a security allocated from each of the plurality of lenders available to service the loan request;
   determining a total number of shares needed from the allocation of securities in the pool of securities to satisfy the loan request;
   selecting two or more lenders from the plurality of lenders to service the loan request, wherein the number of shares received from each of the two or more lenders collectively equal the total number of shares needed to satisfy the loan request;
   distributing the collateral received from the borrower proportionally to the two or more lenders selected based on the number of shares allocated from each lender, wherein a separate escrow account is associated with each lender for receiving the proportional distribution of collateral owed to each lender; and
   providing the borrower with the securities from the two or more lenders selected to service the loan request.

* * * * *